US012144354B2

(12) United States Patent
Buchert et al.

(10) Patent No.: US 12,144,354 B2
(45) Date of Patent: Nov. 19, 2024

(54) COLLOIDAL SILVER-BASED COMPOSITIONS AND METHODS OF USE THEREOF FOR PREVENTING AND CONTROLLING PLANT DISEASES

(71) Applicant: ClearLeaf Inc., Wilmington, DE (US)

(72) Inventors: Agustin Buchert, San Jose (CR);
Lawrence Pratt, Miami, FL (US);
Robin A. Wiscovitch, Green Cove Springs, FL (US)

(73) Assignee: ClearLeaf Inc., Wilmington, DE (US)

( * ) Notice: Subject to any disclaimer, the term of this patent is extended or adjusted under 35 U.S.C. 154(b) by 649 days.

(21) Appl. No.: 17/601,120

(22) PCT Filed: Apr. 3, 2019

(86) PCT No.: PCT/IB2019/052734
§ 371 (c)(1),
(2) Date: Oct. 4, 2021

(87) PCT Pub. No.: WO2020/201814
PCT Pub. Date: Oct. 8, 2020

(65) Prior Publication Data
US 2022/0159963 A1    May 26, 2022

(51) Int. Cl.
*A01N 59/16*    (2006.01)
*A01N 25/04*    (2006.01)

(52) U.S. Cl.
CPC ............. *A01N 59/16* (2013.01); *A01N 25/04* (2013.01)

(58) Field of Classification Search
CPC ............................... A01N 59/16; A01N 25/04
See application file for complete search history.

(56) References Cited

U.S. PATENT DOCUMENTS

| 8,778,860 | B2 * | 7/2014 | Saint Victor ........... A01N 65/44 |
|---|---|---|---|
| | | | 510/463 |
| 8,980,867 | B2 | 3/2015 | Mainx et al. |
| 2009/0012128 | A1 | 1/2009 | Tsuchida et al. |
| 2009/0075818 | A1 | 3/2009 | Rahman Nia |
| 2016/0081347 | A1 * | 3/2016 | Niedermeyer ......... A01N 25/04 |
| | | | 424/618 |
| 2016/0128944 | A1 | 5/2016 | Chawrai et al. |

FOREIGN PATENT DOCUMENTS

| CN | 102316724 A | 1/2012 |
|---|---|---|
| CN | 105961389 A | 9/2016 |
| JP | 2013-508472 A | 3/2013 |
| RU | 2094988 C1 | 11/1997 |
| WO | 2010108973 A2 | 9/2010 |
| WO | 2015180696 A1 | 12/2015 |

* cited by examiner

*Primary Examiner* — Blessing M Fubara
(74) *Attorney, Agent, or Firm* — Fox Rothschild LLP

(57) ABSTRACT

This disclosure provides an eco-friendly colloidal silver-based composition with the ability to prevent and control infections caused by pathogenic microorganisms in superficial organs of plants. The composition comprises water, colloidal silver, methyl vinyl ether copolymer, African palm vegetable oil, polyoxyethylene octylphenyl ether, triethanolamine, sodium hydroxide, and sodium benzoate. Due to its characteristics and the non-systemic application, the disclosed composition is non-toxic to host plants and other multicellular organisms.

25 Claims, No Drawings

COLLOIDAL SILVER-BASED COMPOSITIONS AND METHODS OF USE THEREOF FOR PREVENTING AND CONTROLLING PLANT DISEASES

CROSS REFERENCE TO RELATED APPLICATIONS

This application is the U.S. national phase of International Patent Application No. PCT/IB2019/052734 filed on Apr. 3, 2019. The content of the earlier application is incorporated herein by reference in its entirety.

FIELD OF THE INVENTION

This disclosure relates generally to a composition with antimicrobial activity for use in plants and more specifically to a composition containing colloidal silver, a method of preparation thereof, and a method of use thereof for preventing and controlling plant diseases caused by fungi and bacteria.

BACKGROUND OF THE INVENTION

Agricultural production is reduced worldwide every year due to plant disease; therefore, millions of dollars have been invested in efforts to control these plant diseases. For example, direct losses caused by pathogens, animals, and weeds, together, range from 20% to 40% of global agricultural productivity (Strange & Scott, 2005). Emerging infectious diseases caused by bacterial or fungal plant pathogens can turn into unexpected and serious epidemics, due to the influence of diverse characteristics of the pathogen, the host and the environment.

Various natural and artificial methods of control for protection of plants from these diseases have been applied. Among methods for disease control, use of pesticides is the most prevalent. In recent years, environmental hazards caused by excessive use of pesticides and risks to the health of the workers who handle them have been widely discussed; therefore, scientists in the agricultural field are searching for alternative measures to pesticides.

Thus, there remains a strong need for eco-friendly agents, non-toxic to host plants or other multicellular organisms, for preventing and controlling infections caused by pathogenic microorganisms.

SUMMARY OF THE INVENTION

This disclosure addresses the need mentioned above in a number of aspects. In one aspect, this disclosure provides a composition with fungicidal and bactericidal activity to prevent and control infections caused by pathogenic microorganisms in the plant, such as plant surface organs. The composition comprises water, colloidal silver, methyl vinyl ether copolymer, African palm vegetable oil, polyoxyethylene octylphenyl ether, triethanolamine, sodium hydroxide, and sodium benzoate.

In some embodiments, the composition comprises: 73-95% water, 0.1-20% colloidal silver, 0.5-5.5% methylvinyl ether copolymer, 0.01-15.00% African palm oil vegetable oil, 0.05-0.2% polyoxyethylene octylphenyl ether, 0.02-0.09% triethanolamine, 0.02-0.05% sodium hydroxide, and 0.005-0.015% sodium benzoate.

In some embodiments, the composition comprises: 90.56% water, 5.00% colloidal silver, 3.50% methylvinyl ether copolymer, 0.745% African palm oil vegetable oil, 0.099% polyoxyethylene octylphenyl ether, 0.052% triethanolamine, 0.035% sodium hydroxide, and 0.009% sodium benzoate.

In some embodiments, the composition consists essentially of: 90.56% water, 5.00% colloidal silver, 3.50% methylvinyl ether copolymer, 0.745% African palm oil vegetable oil, 0.099% polyoxyethylene octylphenyl ether, 0.052% triethanolamine, 0.035% sodium to hydroxide, and 0.009% sodium benzoate.

In some embodiments, the water is distilled or deionized. In some embodiments, the African palm oil is characterized by: a specific weight of 0.925-0.935 g/ml; a melting point of 19-26° C.; a point of refraction at 40° C. of 1.45-1.452; a saponification point of 239-257 mg/g; and a content of 12-18 g iodine per 100 g of the composition. In some embodiments, the sodium hydroxide is used to neutralize the African palm oil.

In some embodiments, the colloidal silver has the following characteristics: (a) it is silver suspended in distilled water and produced by dispersion according to published guidelines (NIST, 2012) or by electrical methods of silver electrodes; (b) it has an atomic mass of 107,868 g/mol; (c) it has a melting point of 960.5° C.; (d) it has a boiling point of 2000° C.; (e) it has a density at 15° C. of 10.49 g/mL; (f) it is not attacked by water or atmospheric oxygen; (g) it is obscured by ozone and hydrogen sulfide; (h) it is inert to many acids and reacts easily with dilute nitric acid and hot sulfuric acid; and (i) it is not sensitive to light in their metallic form.

In some embodiments, particles of colloidal silver have an average size of between about 60 nm and about 140 nm. In some embodiments, at least 50% of particles of colloidal silver have a size of between about 60 nm and about 140 nm. In some embodiments, at least 90% of particles of colloidal silver have a size of between about 60 nm and about 140 nm.

In some embodiments, the pathogenic microorganism is fungus or bacterium. The fungus can be one of pathogenic fungus in plants, such as Blumeria, Sphaerotheca, *Phytophthora, Rhizoctonia, Fusarium, Colletotrichum, Botrytis, Magnaporthe, Pythium, Puccinia, Erysiphe, Alternaria, Pseudoperonospora, Plasmodiophora, Sclerotinia, Fulvia, Peronospora, Ustilago*, or *Rhizopus*.

In some embodiments, the infection caused by the pathogenic fungus can be one of: powdery mildew, late blight, *Rhizoctonia* disease, gray mold, blast, damping off, early blight, wilt, anthracnose, stem rot, *Alternaria* disease, *Sclerotium* disease, club root, seed rot, black rot, leaf spot, root rot, rusts, smuts, sooty mold, downy mildew, soft rot, and brown patch.

In some embodiments, the pathogenic bacterium can be one of *Pseudomonas, Xanthomonas, Erwinia, Clavibacter, Ralstonia, Burkholderia*, and *Agrobacterium*. In some embodiments, the infection caused by the pathogenic bacterium can be one of leaf spot, bacterial blights, wildfire, ring rot, canker, black rot, soft rot, galls, crown gall, scab, and bacterial wilt.

In some embodiments, the composition further comprises an agriculturally acceptable carrier. In some embodiments, the composition further comprises a second fungicidal agent and/or a second bactericidal agent. Also within the scope of this disclosure is a fertilizer, formulated from the composition as described, for controlling pathogenic microorganisms. In some embodiments, the fertilizer may further include an agriculturally acceptable carrier.

In another aspect, this disclosure provides a method of preventing and controlling infections caused by pathogenic microorganisms in plant surface organs, using the composition as described above. In some embodiments, the method may include applying the composition to the surface of a plant or a plant part thereof (e.g., leaf, fruit, flower, stem, root). In some embodiments, the method may include applying the composition to a site of infection in the plant. In some embodiments, the method may include applying the composition as a spray, a mist, or a dropper.

In yet another aspect, this disclosure provides a process for preparing the composition as describe above for preventing and controlling infections caused by pathogenic microorganisms in plant surface organs. The method includes: (a) placing 3.7-11.1 kg of African palm oil in a 150 L stainless steel container and heating the African palm oil until the African palm oil is melted; (b) slowly adding 1 L of a 180-530 g/L sodium hydroxide solution and agitating until the African palm oil is dissolved; (c) adding 500-1500 g of polyoxyethylene octyl phenyl ether and 260-780 g of triethanolamine; (d) adding water to obtain 100 L of the solution and stirring to form a homogeneous white suspension; (e) adding 50-140 g of sodium benzoate and stirring until the sodium benzoate is completely dissolved. (f) adding 77.3-85.8 L of water and 2.5-7.5 L of the colloidal silver concentrate in a new 150 L stainless steel vessel and while stirring, adding 10 L of the solution obtained in step (e); (g) after stirring for 5 minutes, adding 1.75-5.25 kg of methyl vinyl ether copolymer, wherein the methyl vinyl ether copolymer was previously polymerized in a stainless steel vessel containing 1.75-5.25 L of deionized water at 40° C.; and (h) agitating continuously until the resultant mixture becomes transparent and viscous.

In some embodiments, the method includes: (a) placing 7.45 kg of African palm oil in a 150 L stainless steel container and heating the African palm oil until the African palm oil is melted; (b) slowly adding 1 L of a 350 g/L sodium hydroxide solution and agitating until the African palm oil is dissolved; (c) adding 990 g of polyoxyethylene octyl phenyl ether and 520 g of triethanolamine; (d) adding water to obtain 100 L of the solution and stirring to form a homogeneous white suspension; (e) adding 90 g of sodium benzoate and stirring until the sodium benzoate is completely dissolved. (f) adding 81.5 L of water and 5 L of the colloidal silver concentrate in a new 150 L stainless steel vessel and while stirring, adding 10 L of the solution obtained in step (e); (g) after stirring for 5 minutes, adding 3.5 kg of methyl vinyl ether copolymer, wherein the methyl vinyl ether copolymer was previously polymerized in a stainless steel vessel containing 3.5 L of deionized water at 40° C.; and (h) agitating continuously until the resultant mixture becomes transparent and viscous.

Also within the scope of this disclosure is a composition prepared by the processes described above.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

DETAILED DESCRIPTION OF THE INVENTION

The antimicrobial properties of silver have been widely recognized, and its efficacy as a topical antimicrobial in human use has been demonstrated. To meet the need of the development of effective, non-toxic, and eco-friendly antimicrobial agents to respond to the omnipresent diseases caused by bacteria and fungi, this disclosure provides a colloidal silver-based composition with the ability to prevent and control infections caused by pathogenic microorganisms in superficial organs of plants by means of a contact action mode (e.g., non-systemic).

The composition comprises colloidal silver as an active/effective component, in which colloidal silver is mixed with polymers and natural triglycerides. When the composition is applied on a plant, it forms microfilm on the surface of the plant and its parts. It prevents the development of infections caused by fungi and bacteria, without any side effect on the foliar epidermis or any other plant surface. Due to the nature of the composition and the non-systemic application, it is non-toxic to host plants, animals, and human, and it does not pollute ecosystems.

The composition comprises an emulsion containing colloidal silver that functions as a fungicide and bactericide to prevent and control many of plant diseases caused by pathogenic fungi and bacteria. The mechanisms involved in the antimicrobial activity of colloidal silver may include: (1) changing and damaging the membrane structure of a microorganism, which increases its permeability and disrupts the transportation functions, resulting in cell death, (2) penetration of a microorganism and interaction with phosphorus and sulfur-containing compounds, such as DNA and proteins, (3) loss of the replication ability of the DNA, (4) inactivation of certain enzymes, (5) attacking the respiratory chain, and (6) generating hydrogen peroxide and free radicals.

The antimicrobial activity exerted by the composition is multifold, employing the principles of microfilm technology and surface chemistry: (1) when applied on the plants, the composition forms microfilm which serves as an effective physical barrier to microorganisms (e.g., bacteria, fungi). The composition is an aqueous suspension of lipids with a high degree of saturation that has a protective effect, in which the alkaline salts of the fatty acids (e.g., fatty acids from African palm oil) associated with the copolymer of methyl vinyl ether and colloidal silver generate effective protective microfilm. The microfilm is generated with the union of chemical bonds between the polymers and the triacylglycerides. The mixture of the alkaline salts of the fatty acids present in these lipids blocks the penetration of the microbial structures; (2) after the microfilm is formed, the embedded colloidal silver can come into direct contact with the microorganisms (e.g., bacteria, fungi) on the surface of a plant organ; (3) when applied near fungi and bacteria on the surface of plants and their parts, the composition neutralizes the enzymes that microorganisms use to metabolize oxygen, and (4) at the same time, it alters the permeability of the membrane of the unicellular organism, inducing effective asphyxiation of the microorganism.

One of the advantages of the disclosed composition is that the methyl vinyl ether copolymer used in the formulation creates an invisible mesh which holds the components together, without interfering with the normal functioning of the plant tissue and allowing cell regeneration in previously infected plant tissue.

In some embodiments, the composition according to this disclosure comprises water, colloidal silver, methyl vinyl ether copolymer, African palm vegetable oil, polyoxyethylene octylphenyl ether, triethanolamine, sodium hydroxide, and sodium benzoate.

In some embodiments, the composition comprises: 73-95% water, 0.1-20% colloidal silver, 0.5-5.5% methylvinyl ether copolymer, 0.01-15.00% African palm vegetable oil, 0.05-0.2% polyoxyethylene octylphenyl ether, 0.02-0.09% triethanolamine, 0.02-0.05% sodium hydroxide, and 0.005-0.015% sodium benzoate.

In some embodiments, the composition comprises: 90.56% water, 5.00% colloidal silver, 3.50% methylvinyl ether copolymer, 0.745% African palm oil vegetable oil, 0.099% polyoxyethylene octylphenyl ether, 0.052% triethanolamine, 0.035% sodium hydroxide, and 0.009% sodium benzoate.

In some embodiments, the composition consists essentially of: 90.56% water, 5.00% colloidal silver, 3.50% methylvinyl ether copolymer, 0.745% African palm oil vegetable oil, 0.099% polyoxyethylene octylphenyl ether, 0.052% triethanolamine, 0.035% sodium hydroxide, and 0.009% sodium benzoate.

In some embodiments, the water is distilled or deionized. In some embodiments, the African palm oil is characterized by: a specific weight of 0.925-0.935 g/ml; a melting point of 19-26° C.; a point of refraction at 40° C. of 1.45-1.452; a saponification point of 239-257 mg/g; and a content of 12-18 g iodine per 100 g of the composition. In some embodiments, the sodium hydroxide is used to neutralize the African palm oil.

In some embodiments, the colloidal silver has the following characteristics:
(a) it is silver suspended in distilled water and produced by dispersion according to published guidelines (NIST, 2012) or by electrical methods of silver electrodes;
(b) it has an atomic mass of 107,868 g/mol;
(c) it has a melting point of 960.5° C.;
(d) it has a boiling point of 2000° C.;
(e) it has a density at 15° C. of 10.49 g/mL;
(f) it is not attacked by water or atmospheric oxygen;
(g) it is obscured by ozone and hydrogen sulfide;
(h) it is inert to many acids and reacts easily with dilute nitric acid and hot sulfuric acid; and
(i) it is not sensitive to light in their metallic form.

The process for preparing the composition may utilize a generator, such as a Robey device. The generator uses a 110 V voltage source, a current controller, two silver electrodes, and a cellulose filter. The cellulose filter restricts the passage of silver colloids of an average particle size of less than about 60 nm and greater than about 600 nm.

In some embodiments, particles of colloidal silver have an average size of between about 60 nm and about 600 nm. In some embodiments, at least 10% (e.g., at least 20%, at least 30%, at least 40%, at least 50%, at least 60%, at least 70%, at least 80%, at least 90%, 100%) of particles of colloidal silver have a size of between about 60 nm and about 600 nm. In some embodiments, at least 90% of particles of colloidal silver have a size of between about 60 nm and about 600 nm. In some embodiments, at least 10% (e.g., at least 20%, at least 30%, at least 40%, at least 50%, at least 60%, at least 70%, at least 80%, at least 90%, 100%) of particles of colloidal silver in the composition exist as nanoparticles having a size of between about 60 nm and about 100 nm.

In some embodiments, the pathogenic microorganism is fungus or bacterium. The fungus can be one of pathogenic fungi in plants, including without limitation, *Blumeria, Sphaerotheca, Phytophthora, Rhizoctonia, Fusarium, Colletotrichum, Botrytis, Magnaporthe, Pythium, Puccinia, Erysiphe, Alternaria, Pseudoperonospora, Plasmodiophora, Sclerotinia, Fulvia, Peronospora, Ustilago*, and *Rhizopus*.

Examples of the infection caused by the pathogenic fungus include, without limitation, powdery mildew, late blight, *Rhizoctonia* disease, gray mold, blast, damping off, early blight, wilt, anthracnose, stem rot, *Alternaria* disease, *Sclerotium* disease, club root, seed rot, black rot, leaf spot, root rot, rusts, smuts, sooty mold, downy mildew, soft rot, and brown patch.

The composition inhibits the growth and development of both Gram-positive bacteria and Gram-negative bacteria. In some embodiments, examples of pathogenic bacteria include, without limitation, *Pseudomonas, Xanthomonas, Erwinia, Clavibacter, Ralstonia, Burkholderia*, and *Agrobacterium*.

In some embodiments, the infection caused by the pathogenic bacteria includes, without limitation, leaf spot, bacterial blights, wildfire, ring rot, canker, black rot, soft rot, galls, crown gall, scab, and bacterial wilt.

In some embodiments, the composition further comprises an agriculturally compatible or acceptable carrier. The agriculturally compatible or acceptable carrier can be an adhesion agent or a surfactant. Also within the scope of this disclosure is a fertilizer, formulated from the composition as described, for controlling pathogenic microorganisms. In some embodiments, the fertilizer may further include an agriculturally acceptable carrier.

"Agriculturally compatible carrier" or "agriculturally acceptable carrier" refers to any material, other than water, which can be added to a composition without causing or having an adverse effect on the plant or the like. In some embodiments, the carrier can be a solid carrier or liquid carrier, and in various forms including microspheres, powders, emulsions and the like. The carrier may be any one or more of a number of carriers that confer a variety of properties, such as increased stability, wettability, or dispersability. In some embodiments, examples of the carrier may include, without limitation, alginate, gums, starches, lecithins, formononetin, polyvinyl alcohol, alkali formononetinate, hesperetin, polyvinyl acetate, cephalins, Gum Arabic, Xanthan Gum, Mineral Oil, Polyethylene Glycol (PEG), Polyvinyl pyrrolidone (PVP), Arabino-galactan, Methyl Cellulose, PEG 400, Chitosan, Polyacrylamide, Polyacrylate, Polyacrylonitrile, Glycerol, Triethylene glycol, Vinyl Acetate, Gellan Gum, Polystyrene, Polyvinyl, Carboxymethyl cellulose, Gum Ghatti, and polyoxyethylene-polyoxybutylene block copolymers. The carrier can be non-naturally occurring compounds, e.g., polymers and copolymers. For example, non-limiting examples of polymers that can be used as an adhesive agent include: polyvinyl acetates, polyvinyl acetate copolymers, ethylene vinyl acetate (EVA) copolymers, polyvinyl alcohols, polyvinyl alcohol copolymers, celluloses (e.g., ethylcelluloses, methylcelluloses, hydroxymethylcelluloses, hydroxypropylcelluloses, and carboxymethylcelluloses), polyvinylpyrolidones, vinyl chloride, vinylidene chloride copolymers, calcium lignosulfonates, acrylic copolymers, polyvinylacrylates, polyethylene oxide, acylamide polymers and copolymers, polyhydroxyethyl acrylate, methylacrylamide monomers, and polychloroprene.

In some embodiments, the composition may also contain a surfactant. Non-limiting examples of surfactants include nitrogen-surfactant blends such as Prefer 28 (Cenex), Surf-N(US), Inhance (Brandt), P-28 (Wilfarm) and Patrol (Helena); esterified seed oils include Sun-It II (AmCy), MSO (UAP), Scoil (Agsco), Hasten (Wilfarm) and Mes-100 (Drexel); and organo-silicone surfactants include Silwet L77 (UAP), Silikin (Terra), Dyne-Amic (Helena), Kinetic (Helena), Sylgard 309 (Wilbur-Ellis) and Century (Precision). In some embodiments, the surfactant is present at a concentration of between 0.001% v/v to 10% v/v (e.g., between 0.001% v/v to 1% v/v).

In some embodiments, the composition may include a stabilizer. Such an agent can include one or more of trehalose, sucrose, glycerol, and methylene glycol. Other suitable stabilizers include, but are not limited to, non reducing sugars and sugar alcohols (e.g., mannitol or sorbitol).

In some embodiments, the composition further comprises a second fungicidal agent and/or a second bactericidal agent. In some embodiments, it can be advantageous for the composition to include agents such as a fungicide, an antibacterial agent, or a nutrient. The agent is ideally one which does not cause safety concerns for human, animal or industrial use (e.g., no safety issues, or the compound is sufficiently labile that the commodity plant product derived from the plant contains negligible amounts of the compound).

As used herein, a "fungicide" includes a commercially available synthetic chemical compound that is designed to protect crop plants from pathogenic fungi and can have detrimental effects on a beneficial fungal and/or bacterial growth when that plant host has been treated with the fungicide. Examples of the fungicide may include, without limitation, 2-(thiocyanatomethylthio)-benzothiazole, 2-phenylphenol, 8-hydroxyquinoline sulfate, ametoctradin, amisulbrom, antimycin, *Ampelomyces quisqualis*, azaconazole, azoxystrobin, *Bacillus subtilis*, benalaxyl, benomyl, benthiavalicarb-isopropyl, benzylaminobenzene-sulfonate (BABS) salt, bicarbonates, biphenyl, bismerthiazol, bitertanol, bixafen, blasticidin-S, borax, Bordeaux mixture, boscalid, bromuconazole, bupirimate, calcium polysulfide, captafol, captan, carbendazim, carboxin, carpropamid, carvone, chloroneb, chlorothalonil, chlozolinate, *Coniothyrium minitans*, copper hydroxide, copper octanoate, copper oxychloride, copper sulfate, copper sulfate (tribasic), cuprous oxide, cyazofamid, cyflufenamid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dithianon, dodemorph, dodemorph acetate, dodine, dodine free base, edifenphos, enestrobin, epoxiconazole, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fentin, fentin acetate, fentin hydroxide, ferbam, ferimzone, fluazinam, fludioxonil, flumorph, fluopicolide, fluopyram, fluoroimide, fluoxastrobin, fluquinconazole, flusilazole, flusulfamide, flutianil, flutolanil, flutriafol, fluxapyroxad, folpet, formaldehyde, fosetyl, fosetyl-aluminium, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), ipconazole, iprobenfos, iprodione, iprovalicarb, isoprothiolane, isopyrazam, isotianil, kasugamycin, kasugamycin hydrochloride hydrate, kresoxim-methyl, mancopper, mancozeb, mandipropamid, maneb, mepanipyrim, mepronil, mercuric chloride, mercuric oxide, mercurous chloride, metalaxyl, mefenoxam, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid (fatty acids), orysastrobin, oxadixyl, oxine-copper, oxpoconazole fumarate, oxycarboxin, pefurazoate, penconazole, pencycuron, penflufen, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, prothioconazole, pyraclostrobin, to pyrametostrobin, pyraoxystrobin, pyrazophos, pyribencarb, pyributicarb, pyrifenox, pyrimethanil, pyroquilon, quinoclamine, quinoxyfen, quintozene, *Reynoutria sachalinensis* extract, sedaxane, silthiofam, simeconazole, sodium 2-phenylphenoxide, sodium bicarbonate, sodium pentachlorophenoxide, spiroxamine, sulfur, SYP-Z071, SYP-Z048, tar oils, tebuconazole, tebufloquin, tecnazene, tetraconazole, thiabendazole, thifluzamide, thiophanate-methyl, thiram, tiadinil, tolclofos-methyl, tolylfluanid, triadimefon, triadimenol, triazoxide, tricyclazole, tridemorph, trifloxystrobin, triflumizole, triforine, triticonazole, validamycin, valifenalate, valiphenal, vinclozolin, zineb, ziram, zoxamide, *Candida oleophila, Fusarium oxysporum, Gliocladium* spp., *Phlebiopsis gigantea, Streptomyces griseoviridis, Trichoderma* spp., (RS)—N-(3,5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin-1-yl)ethanol, 2,3-dihydro-5-phenyl-1,4-dithiine 1,1,4,4-tetraoxide, 2-methoxyethylmercury acetate, 2-methoxyethylmercury chloride, 2-methoxyethylmercury silicate, 3-(4-chlorophenyl)-5-methylrhodanine, 4-(2-nitroprop-1-enyl) phenyl thiocyanateme, ampropylfos, anilazine, azithiram, barium polysulfide, Bayer 32394, benodanil, benquinox, bentaluron, benzamacril; benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, cyclafuramid, cypendazole, cyprofuram, decafentin, dichlone, dichlozoline, diclobutrazol, dimethirimol, dinocton, dinosulfon, dinoterbon, dipyrithione, ditalimfos, dodicin, drazoxolon, EBP, ESBP, etaconazole, etem, ethirim, fenaminosulf, fenapanil, fenitropan, 5-fluorocyto sine and pro fungicides thereof, fluotrimazole, furcarbanil, furconazole, furconazole-cis, furmecyclox, furophanate, glyodine, griseofulvin, halacrinate, Hercules 3944, hexylthiofos, ICIA0858, isopamphos, isovaledione, mebenil, mecarbinzid, metazoxolon, methfuroxam, methylmercury dicyandiamide, metsulfovax, milneb, mucochloric anhydride, myclozolin, N-3,5-dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, picolinamide UK-2A and derivatives thereof, prothiocarb; prothiocarb hydrochloride, pyracarbolid, pyridinitril, pyroxychlor, pyroxyfur, quinacetol; quinacetol sulfate, quinazamid, quinconazole, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, urbacid, XRD-563, and zarilamide. IK-1140.

Examples of the bactericidal agent may include, without limitation, Amikacin, Gentamicin, Kanamycin, Neomycin, Netilmicin, Tobramycin, Paromomycin, Spectinomycin, Geldanamycin, Herbimycin, Rifaximin, streptomycin, Loracarbef, Ertapenem, Doripenem, Imipenem/Cilastatin, Meropenem, Cefadroxil, Cefazolin, Cefalotin or Cefalothin, Cefalexin, Cefaclor, Cefamandole, Cefoxitin, Cefprozil, Cefuroxime, Cefixime, Cefdinir, Cefditoren, Cefoperazone, Cefotaxime, Cefpodoxime, Ceftazidime, Ceftibuten, Ceftizoxime, Ceftriaxone, Cefepime, Ceftaroline fosamil, Ceftobiprole, Teicoplanin, Vancomycin, Telavancin, Clindamycin, Lincomycin, Daptomycin, Azithromycin, Clarithromycin, Dirithromycin, Erythromycin, Roxithromycin, Troleandomycin, Telithromycin, Spiramycin, Aztreonam, Furazolidone, Nitrofurantoin, Linezolid, Po sizolid, Radezolid, Torezolid, Amoxicillin, Ampicillin, Azlocillin, Carbenicillin, Cloxacillin, Dicloxacillin, Flucloxacillin, Mezlocillin, Methicillin, Nafcillin, Oxacillin, Penicillin G, Penicillin V, Piperacillin, Penicillin G, Temocillin, Ticarcillin, Amoxicillin/clavulanate, Ampicillin/sulbactam, Piperacillin/tazobactam, Ticarcillin/clavulanate, Bacitracin, Colistin, Polymyxin B, Ciprofloxacin, Enoxacin, Gatifloxacin, Levofloxacin, Lomefloxacin, Moxifloxacin, Nalidixic acid, Norfloxacin, Ofloxacin, Trovafloxacin, Grepafloxacin, Sparfloxacin, Temafloxacin, Mafenide, Sulfacetamide, Sulfadiazine, Silver sulfadiazine, Sulfadimethoxine, Sulfamethizole, Sulfamethoxazole, Sulfanilimide (archaic), Sulfasalazine, Sulfisoxazole, Trimethoprim-Sulfamethoxazole (Co-trimoxazole) (TMP-SMX), Sulfonamidochrysoidine (archaic), Demeclocycline, Doxycycline, Minocycline, Oxytetracycline, Tetracycline, Clofazimine, Dapsone, Capreomycin, Cycloserine, Ethambutol, Ethionamide, Isoniazid, Pyrazinamide, Rifampicin (Rifampin in US), Rifabutin, Rifapentine, Streptomycin, Arsphenamine, Chloramphenicol, Fosfomycin, Fusidic acid, Metronidazole, Mupirocin, Platensimycin, Quinupristin/Dalfopristin, Thiamphenicol, Tigecycline, Tinidazole, and Trimethoprim.

The disclosed composition for controlling pathogenic microorganisms in plants may selectively control pathogenic fungi and/or bacteria in plants at a very low concentration. In addition, when the composition is applied once, preventive effects may continue for 1-3 weeks or longer. The composition can control both spores and hyphae, and has no chemical injury even if it is applied at a high concentration, and also, is harmless to the human body and to plants. The colloidal silver contained in the composition has high preservability, and may be used in the state of being diluted in tap water or agricultural water, which may be more easily handled and may reduce controlling costs.

According to another aspect, this disclosure also provides a method of preventing and controlling infections caused by pathogenic microorganisms in plant surface organs, using the composition as described above. In some embodiments, the method may include applying the composition to the surface of a plant or a plant part thereof (e.g., leaf, fruit, flower, stem, root). In some embodiments, the method may include applying the composition to a site of infection in the plant or the plant part thereof (e.g., leaf, fruit, flower, stem, root). In some embodiments, the method may include applying the composition as a spray, a mist, or a dropper.

The composition may be mixed with an agriculturally acceptable carrier or diluent and thus be formulated into various formulations including agricultural chemicals or fertilizers. In addition, the composition may be mixed with an additionally used fertilizer component or surfactant or other known agents that control plant diseases. The term "diluent" means an agriculturally acceptable liquid or solid which is added to the composition so that it can be readily used or diluted at a desired active concentration. Examples of the diluent include talc, kaolin, zeolite, xylene, diatom, water, etc.

The formulation for use in a spray type, such as a water-dispersed concentrate or wet powder, may further include a wetting agent, a dispersant, a surfactant, etc. In addition to the diluent and the surfactant, a stabilizer, an inactivating agent, an adhesion improver, a colorant, an infiltrating agent, and a defoamer may be additionally included.

The disclosed composition may be formulated into various forms. For example, the wet powder form prepared along with kaolin or diatoms can be diluted with water before being used as a spraying liquid, and thus, may be sprayed onto leaves, flowers, or fruits, or applied to roots. Further, the composition may be mixed with an emulsifier to obtain a concentrate, which is then diluted with water before being applied to plants.

In yet another aspect, this disclosure provides a process for preparing a composition with fungicidal and bactericidal activity to prevent and control infections caused by pathogenic microorganisms in plant surface organs. This process takes several steps that begin with the preparation of the colloidal silver concentrate; 100 liters of distilled or deionized water is poured into a stainless steel container, and a polyethylene hose connected to a water pump is inserted. The water pump drives the water to the generator of the colloidal silver, which is connected to a source of voltage of 110 V. The generator is composed of a pump to control the amount of water that enters the electrodes and another to regulate the amount of water that leaves the system. The second water pump, connected to a 110 V outlet, recirculates for one minute the water containing the colloidal silver in the system, to increase the concentration of silver and thus ensure that the final product contains the required silver concentration. The controlled size of colloidal silver is obtained by filtration.

A solution is then prepared by placing 3.7-11.1 kg of African palm oil in a 150 L stainless steel vessel, heating it until melting, and slowly adding 1 L of a sodium hydroxide solution containing 180-530 g of NaOH per liter, then mix until it dissolves. Then, 500-1500 g of polyoxyethylene octylphenyl ether and 260-780 g of triethanolamine are added. Water is added to obtain 100 L of solution and stirred to form a homogeneous white suspension. Then 50-140 g of sodium benzoate is added, stirring until completely dissolved.

For the final preparation, in a new 150 L stainless steel container, 77.3-85.8 L of water and 5 L of the colloidal silver concentrate are added. Then, 10 L of the African palm solution are added while stirring. The mixture is stirred for 5 minutes, and 1.75-5.25 kg of methyl vinyl ether copolymer are added, which was previously polymerized in a stainless steel vessel containing 1.75-5.25 L of deionized water at 40° C. Continuous agitation is applied until the product becomes transparent and viscous.

In some embodiments, the process includes:
(a) placing 7.45 kg of African palm oil in a 150 L stainless steel container and heating the African palm oil until the African palm oil is melted;
(b) slowly adding 1 L of a 350 g/L sodium hydroxide solution and agitating until the African palm oil is dissolved;
(c) adding 990 g of polyoxyethylene octyl phenyl ether and 520 g of triethanolamine;
(d) adding water to obtain 100 L of the solution and stirring to form a homogeneous white suspension;

(e) adding 90 g of sodium benzoate and stirring until the sodium benzoate is completely dissolved;

(f) adding 81.5 L of water and 5 L of the colloidal silver concentrate in a new 150 L stainless steel vessel and while stirring, adding 10 L of the solution obtained in step (e);

(g) after stirring for 5 minutes, adding 3.5 kg of methyl vinyl ether copolymer, wherein the methyl vinyl ether copolymer was previously polymerized in a stainless steel vessel containing 3.5 L of deionized water at 40° C.; and (h) agitating continuously until the resultant mixture becomes transparent and viscous.

Also within the scope of this disclosure is a composition prepared by the process described above.

A better understanding of the present invention may be obtained through the following examples which are set forth to illustrate, but are not to be construed as the limit of the present invention.

EXAMPLES

Example 1

A preparation of the disclosed composition according to the invention was diluted 10 times using tap water and sprayed onto the surface of coffee (*Coffea arabica*) plants, using a motorized back sprayer pump. The entire foliar surface of coffee leaves was covered in a wet application of the composition. According to data collected on an observation done 30 days after application, the incidence of coffee leaf rust (*Hemileia vastatrix*) infection was reduced up to 70% compared to untreated plants. Also, the plants treated with the composition presented vigorous health and no signs of adverse reactions. The same results were observed up to 6 weeks after the initial application.

During the field trial for the control of coffee leaf rust, results were also collected on the control of bacterial leaf spot of coffee caused by the bacteria *Pseudomonas syringae*. The incidence of the bacterial infection was greatly reduced in the plants treated with the composition, and no new development of the infection was observed once the plants were sprayed with a preparation of the invention.

Example 2

An undiluted preparation of the invention was sprayed onto single banana (Musa sp) leaves using a pressurized mist sprayer. The presence of germinated spores of the Black Sigatoka fungus (*Mycosphaerella fijiensis*) was tested. Results showed a 62% reduction in the germination of *M. fijiensis* spores, compared to untreated controls. These results were comparable to commercial fungicides commonly used in the banana crop. The reduction in the germination of *M. fijiensis* spores was maintained up to 8 weeks after application.

Example 3

According to one embodiment of the invention, a formulation was prepared and sprayed onto recently harvested roses (Rosa sp). The plant material was then placed onto a chamber that simulated the temperature, light and humidity conditions of naval export, and kept under these conditions for 6 days. Flowers sprayed with distilled water were also included as controls. After 6 days, 100% of control flowers presented mild to heavy signs of infection by the fungus *Botrytis cinerea*, which completely spoils the produce. None of the flowers treated with the invention presented signs of infection by *B. cinerea* or any other fungi or bacteria.

Example 4

Yet another variation of the invention was prepared and sprayed onto the cut site of recently harvested banana (Musa sp) hands (bunches). The treated hands were placed inside a chamber that simulated the temperature, light and humidity conditions of naval export, along with controls treated with commercial microbicides. After several days, the material was examined for the presence of fungal or bacterial infection, showing results for the disclosed composition that were comparable or better than the controls.

Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., weight percents, proximate to the recited range that are equivalent in terms of the functionality of the individual ingredient, the composition, or the embodiment.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

Other objects, features, and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

What is claimed is:

1. A composition with fungicidal and bactericidal activity to prevent and control infections caused by pathogenic microorganisms, comprising: water, colloidal silver, methyl vinyl ether copolymer, African palm vegetable oil, polyoxyethylene octylphenyl ether, triethanolamine, sodium hydroxide, and sodium benzoate.

2. The composition of claim 1, comprising:
   73-95% water,
   0.1-20% colloidal silver,
   0.5-5.5% methylvinyl ether copolymer,
   0.01-15.00% African palm vegetable oil,
   0.05-0.2% polyoxyethylene octylphenyl ether,
   0.02-0.09% triethanolamine,
   0.02-0.05% sodium hydroxide, and
   0.005-0.015% sodium benzoate.

3. The composition of claim 1, comprising:
   90.56% water,
   5.00% colloidal silver,
   3.50% methylvinyl ether copolymer,
   0.745% African palm oil vegetable oil,
   0.099% polyoxyethylene octylphenyl ether,
   0.052% triethanolamine,
   0.035% sodium hydroxide, and
   0.009% sodium benzoate.

4. The composition of claim 1, consisting essentially of:
   90.56% water,
   5.00% colloidal silver,
   3.50% methylvinyl ether copolymer,
   0.745% African palm oil vegetable oil,
   0.099% polyoxyethylene octylphenyl ether,
   0.052% triethanolamine,
   0.035% sodium hydroxide, and
   0.009% sodium benzoate.

5. The composition of claim 1, wherein the water is distilled or deionized.

6. The composition of claim 1, wherein the African palm oil is characterized by:
   a specific weight of 0.925-0.935 g/ml;
   a melting point of 19-26° C.;
   a point of refraction at 40° C. of 1.45-1.452;
   a saponification point of 239-257 mg/g; and
   a content of 12-18 g iodine per 100 g of the composition.

7. The composition of claim 1, wherein the sodium hydroxide is used to neutralize the African palm oil.

8. The composition of claim 1, wherein the colloidal silver has the following characteristics:
   (a) it is silver suspended in distilled water and produced by dispersion according to published guidelines (NIST, 2012) or by electrical methods of silver electrodes;
   (b) it has an atomic mass of 107,868 g/mol;
   (c) it has a melting point of 960.5° C.;
   (d) it has a boiling point of 2000° C.;
   (e) it has a density at 15° C. of 10.49 g/mL;
   (f) it is not attacked by water or atmospheric oxygen;
   (g) it is obscured by ozone and hydrogen sulfide;
   (h) it is inert to many acids and reacts easily with dilute nitric acid and hot sulfuric acid; and
   (i) it is not sensitive to light in their metallic form.

9. The composition of claim 1, wherein particles of colloidal silver have an average size of between about 60 nm and about 600 nm.

10. The composition of claim 1, wherein at least 50 % of particles of colloidal silver have a size of between about 60 nm and about 600 nm.

11. The composition of claim 1, wherein at least 90 % of particles of colloidal silver have a size of between about 60 nm and about 600 nm.

12. The composition of claim 1, wherein the pathogenic microorganisms are fungi or bacteria.

13. The composition of claim 12, wherein the pathogenic fungi are selected from the group consisting of: Blumeria, Sphaerotheca, Phytophthora, Rhizoctonia, Fusarium, Colletotrichum, Botrytis, Magnaporthe, Pythium, Puccinia, Erysiphe, Alternaria, Pseudoperonospora, Plasmodiophora, Sclerotinia, Fulvia, Peronospora, Ustilago, and Rhizopus.

14. The composition of claim 12, wherein the infection caused by the pathogenic fungi is selected from the group consisting of: powdery mildew, late blight, Rhizoctonia disease, gray mold, blast, damping off, early blight, wilt, anthracnose, stem rot, Alternaria disease, Sclerotium disease, club root, seed rot, black rot, leaf spot, root rot, rusts, smuts, sooty mold, downy mildew, soft rot, and brown patch.

15. The composition of claim 12, wherein the pathogenic bacteria are selected from the group consisting of: *Pseudomonas, Xanthomonas, Erwinia, Clavibacter, Ralstonia, Burkholderia*, and *Agrobacterium*.

16. The composition of claim 12, wherein the infection caused by the pathogenic bacterium is selected from the group consisting of: leaf spot, bacterial blights, wildfire, ring rot, canker, black rot, soft rot, galls, crown gall, scab, and bacterial wilt.

17. The composition of claim 1, further comprising an agriculturally acceptable carrier.

18. The composition of claim 1, further comprising at least one of a second fungicidal agent and a second bactericidal agent.

19. A fertilizer, formulated from the composition of claim 1 for controlling pathogenic microorganisms in plants and optionally an agriculturally acceptable carrier.

20. A method of preventing and controlling infections caused by pathogenic microorganisms, using the composition of claim 1.

21. The method of claim 20, comprising applying the composition to a surface of a plant or a plant part thereof.

22. The method of claim 20, comprising applying the composition to the plant for preventing and controlling infections on the plant.

23. The method of claim 20, comprising applying the composition as a spray, a mist, or a dropper.

24. A process for preparing the composition of claim 1 for preventing and controlling infections caused by pathogenic microorganisms, comprising:
(a) placing 3.7-11.1 kg of African palm oil in a 150 L stainless steel container and heating the African palm oil until the African palm oil is melted;
(b) slowly adding 1 L of a 180-530 g/L sodium hydroxide solution and agitating until the African palm oil is dissolved;
(c) adding 500-1500 g of polyoxyethylene octyl phenyl ether and 260-780 g of triethanolamine;
(d) adding water to obtain 100 L of solution and stirring to form a homogeneous white suspension;
(e) adding 50-140 g of sodium benzoate and stirring until the sodium benzoate is completely dissolved;
(f) adding 77.3-85.8 L of water and 2.5-7.5 L of the colloidal silver concentrate in a new 150 L stainless steel vessel and while stirring, adding 10 L of the solution obtained in step (e);
(g) after stirring for 5 minutes, adding 1.75-5.25 kg of methyl vinyl ether copolymer, wherein the methyl vinyl ether copolymer was previously polymerized in a stainless steel vessel containing 1.75-5.25 L of deionized water at 40° C.; and
(h) agitating continuously until the resultant mixture becomes transparent and viscous.

25. The process of claim 24, comprising:
(a) placing 7.45 kg of African palm oil in a 150 L stainless steel container and heating the African palm oil until the African palm oil is melted;
(b) slowly adding 1 L of a 350 g/L sodium hydroxide solution and agitating until the African palm oil is dissolved;
(c) adding 990 g of polyoxyethylene octyl phenyl ether and 520 g of triethanolamine;
(d) adding water to obtain 100 L of solution and stirring to form a homogeneous white suspension;
(e) adding 90 g of sodium benzoate and stirring until the sodium benzoate is completely dissolved;
(f) adding 81.5 L of water and 5 L of the colloidal silver concentrate in a new 150 L stainless steel vessel and while stirring, adding 10 L of the solution obtained in step (e);
(g) after stirring for 5 minutes, adding 3.5 kg of methyl vinyl ether copolymer, wherein the methyl vinyl ether copolymer was previously polymerized in a stainless steel vessel containing 3.5 L of deionized water at 40° C.; and
(h) agitating continuously until the resultant mixture becomes transparent and viscous.

* * * * *

UNITED STATES PATENT AND TRADEMARK OFFICE
CERTIFICATE OF CORRECTION

Page 1 of 1

PATENT NO. : 12,144,354 B2
APPLICATION NO. : 17/601120
DATED : November 19, 2024
INVENTOR(S) : Agustin Buchert et al.

It is certified that error appears in the above-identified patent and that said Letters Patent is hereby corrected as shown below:

In the Specification

Column 2, Line 8 after "sodium" delete "to".

Column 6, Line 44 delete "Arabino-galactan," and insert -- Arabinogalactan, --.

Column 6, Line 57 delete "polyvinylpyrolidones," and insert -- polyvinylpyrrolidones, --.

Column 8, Line 13 after "pyraclostrobin," delete "to".

Column 8, Line 36 delete "thiocyanateme," and insert -- thiocyanate, --.

Column 8, Line 46 delete "ethirim" and insert -- ethirimol, --.

Column 8, Line 47 delete "5-fluorocyto sine" and insert -- 5-fluorocytosine --.

Column 8, Line 49 delete "glyodine," and insert -- glyodin, --.

Column 9, Line 14 delete "Po sizolid," and insert -- Posizolid, --.

Column 12, Line 39 delete ""I"" and insert -- "/" --.

Signed and Sealed this
Second Day of September, 2025

Coke Morgan Stewart
*Acting Director of the United States Patent and Trademark Office*